US006233374B1

United States Patent
Ogle et al.

(10) Patent No.: US 6,233,374 B1
(45) Date of Patent: May 15, 2001

(54) MANDREL-WOUND FIBER OPTIC PRESSURE SENSOR

(75) Inventors: Peter C. Ogle, Charlestown, RI (US); Daniel L. Gysling, Glastonbury, CT (US)

(73) Assignee: CiDRA Corporation, Wallingford, CT (US)

(*) Notice: Subject to any disclaimer, the term of this patent is extended or adjusted under 35 U.S.C. 154(b) by 0 days.

(21) Appl. No.: 09/326,097

(22) Filed: Jun. 4, 1999

(51) Int. Cl.[7] .................................. G02B 6/00; G01J 1/04
(52) U.S. Cl. .................................. 385/13; 385/12; 385/37; 385/123; 250/227.11; 250/227.14; 250/227.18
(58) Field of Search .................................. 385/12, 13, 27, 385/37, 31, 123; 250/227.11, 227.14, 227.18

(56) References Cited

U.S. PATENT DOCUMENTS

| 4,376,390 | 3/1983 | Rines | 73/517 |
|---|---|---|---|
| 4,403,144 | 9/1983 | Strahan et al. | 250/231 |
| 4,419,895 | 12/1983 | Fuller | 73/517 |
| 4,429,573 | 2/1984 | Walker | 73/510 |
| 4,525,818 | * 6/1985 | Cielo et al. | 385/13 X |
| 4,534,222 | 8/1985 | Finch et al. | 73/653 |
| 4,567,771 | 2/1986 | Nelson et al. | 73/653 |
| 4,595,830 | 6/1986 | McMahon | 250/227 |
| 4,635,482 | 1/1987 | Walker | 73/517 |
| 4,671,113 | 6/1987 | Carome | 73/516 |
| 4,724,316 | * 2/1988 | Morton | 385/13 X |
| 4,725,110 | 2/1988 | Glenn et al. | 350/3.61 |
| 4,739,661 | 4/1988 | Bucholtz et al. | 73/517 |
| 4,743,116 | 5/1988 | Udd et al. | 356/350 |
| 4,755,051 | 7/1988 | Cahill et al. | 356/345 |
| 4,761,073 | 8/1988 | Meltz et al. | 356/32 |
| 4,800,267 | 1/1989 | Freal et al. | 250/227 |
| 4,806,012 | 2/1989 | Meltz et al. | 356/32 |
| 4,829,821 | 5/1989 | Carome | 73/517 |
| 4,860,586 | 8/1989 | Miers et al. | 250/227 |
| 4,876,447 | 10/1989 | Killian | 250/227 |
| 4,893,930 | 1/1990 | Garrett et al. | 356/345 |
| 4,900,918 | 2/1990 | Killian | 250/227 |
| 4,900,919 | 2/1990 | Twerdochlib | 250/227 |

(List continued on next page.)

OTHER PUBLICATIONS

"Monitoring Structural Performance with Optical TDR Techniques," Alan D. Kersey, Sep. 17–19, 1994, pp. 432–442.

"Multiplexed fiber Bragg grating strain–sensor system with a Fabry Perot wavelength filter," Alan D. Kersey, Opt. Letters, vol. 18, No. 16, Aug. 1993.

*Primary Examiner*—Brian Healy
(74) *Attorney, Agent, or Firm*—Ware, Fressola Van der Sluys & Adolphson LLP

(57) ABSTRACT

A dynamic pressure sensor with measures for its operation in high temperature and high pressure environments. The sensor uses at least one winding about a deformable mandrel of an optical fiber inscribed by a Bragg grating at its beginning and another at the end of the winding. To counter the effects of high ambient static pressure and temperature, various steps are taken: the mandrel is filled with a high-viscosity low bulk modulus fluid, such as a silicone fluid, and is provided with a baffle system that regulates the flow of the fluid between spans around which the optical fiber is wound. The baffle system is based either on protuberances on a core rod inserted into the mandrel and a system of pinhole size passageways through the protuberances, or based on an open cell foam or fibrous material located on a core rod within a span covered by a stiff jacket. In addition, in high pressure gradient applications, the mandrel is pinched off at different locations along its length. To keep static strain low in the optical fiber windings, the mandrel is covered with materials soft enough that the tension-wound optical fiber can cut into the materials instead of building up unacceptable static strain.

26 Claims, 4 Drawing Sheets

U.S. PATENT DOCUMENTS

| | | | |
|---|---|---|---|
| 4,930,862 | 6/1990 | Miers et al. | 350/96.29 |
| 4,932,263 | 6/1990 | Wlodarczyk | 73/705 |
| 4,950,883 | 8/1990 | Glenn | 250/227.14 |
| 4,996,419 | 2/1991 | Morey | 250/227.18 |
| 5,061,069 | 10/1991 | Califano | 356/345 |
| 5,099,690 | 3/1992 | Califano | 73/510 |
| 5,134,882 | 8/1992 | Taylor | 73/517 |
| 5,155,548 | 10/1992 | Danver et al. | 356/345 |
| 5,218,197 | 6/1993 | Carroll | 250/227.19 |
| 5,276,322 | 1/1994 | Carome | 250/227.21 |
| 5,308,973 | 5/1994 | Odoni et al. | 250/227.17 |
| 5,317,576 * | 5/1994 | Leonberger et al. | 385/37 X |
| 5,317,929 | 6/1994 | Brown et al. | 73/517 |
| 5,339,696 | 8/1994 | Carignan | 73/862.04 |
| 5,361,130 | 11/1994 | Kersey et al. | 356/345 |
| 5,363,342 | 11/1994 | Layton et al. | 367/149 |
| 5,369,485 | 11/1994 | Hofler et al. | 356/345 |
| 5,394,488 * | 2/1995 | Fernald et al. | 385/13 |
| 5,399,854 | 3/1995 | Dunphy et al. | 250/227.17 |
| 5,401,956 | 3/1995 | Dunphy et al. | 250/227.18 |
| 5,420,688 | 5/1995 | Farah | 356/358 |
| 5,426,297 | 6/1995 | Dunphy et al. | 250/227.23 |
| 5,444,803 | 8/1995 | Kim et al. | 385/28 |
| 5,451,772 | 9/1995 | Narendran | 250/227.19 |
| 5,452,087 | 9/1995 | Taylor et al. | 356/352 |
| 5,493,113 | 2/1996 | Dunphy et al. | 250/227.19 |
| 5,493,390 | 2/1996 | Varasi et al. | 356/32 |
| 5,495,892 | 3/1996 | Carisella | 166/387 |
| 5,507,341 | 4/1996 | Eslinger et al. | 166/187 |
| 5,513,913 | 5/1996 | Ball et al. | 374/120 |
| 5,529,346 | 6/1996 | Sperring | 285/93 |
| 5,564,504 | 10/1996 | Carisella | 166/387 |
| 5,633,748 * | 5/1997 | Perez et al. | 385/13 X |
| 5,633,960 | 5/1997 | Laqakos et al. | 385/12 |
| 5,845,033 | 12/1998 | Berthold et al. | 385/12 |

* cited by examiner

MANDREL-WOUND FIBER OPTIC PRESSURE SENSOR

FIELD OF THE INVENTION

The present invention pertains to the measurement of dynamic pressure, such as acoustic pressure. More particularly, the present invention pertains to a fiber optic dynamic pressure sensor including an optical fiber wound about a compliant mandrel and having at least two Bragg gratings, one at each end of the winding or at each end of a series of several windings.

BACKGROUND OF THE INVENTION

Sometimes a measurement of dynamic pressure is needed, and, often, the dynamic pressure is small in comparison to the static or quasi-static pressure in the environment where the measurement is needed. For example, it is often of interest to sense underwater acoustic waves at depths where the hydrostatic pressure overwhelms by many orders of magnitude the acoustic waves. The dynamic pressure is here understood to be a changing pressure, such as the pressure change accompanying the passage of an underwater or airborne acoustic wave, but can include variations in pressure that occur much more slowly or much more rapidly.

One way of measuring dynamic pressure is to sense the change in diameter of a compliant mandrel exposed to the dynamic pressure. A cylindrical body, possibly hollow, or in other words air-backed, is often used as a compliant mandrel; using an air-backed, instead of a solid mandrel, results in a more compliant mandrel. The changing pressure ultimately produces a changing circumferential stress, also called hoop stress. At the same time, in what is called Poisson's effect, when an increase in pressure squeezes radially on the mandrel, the mandrel lengthens at the same time it thins, i.e. the mandrel experiences both axial and circumferential strains. In monitoring dynamic pressure, a sensor can base its measurement on either circumferential strain of a mandrel, i.e. a change in diameter of the mandrel, or on axial strain if the mandrel is of a construction that exhibits an appreciable Poisson's effect.

To transform a change in shape of a deformable mandrel into a signal corresponding to the dynamic pressure acting on the mandrel, an optical fiber having one or more Bragg gratings is often affixed to the mandrel so that, depending on how it is affixed, the optical fiber is forced to undergo either the same axial strain or the same hoop strain as the mandrel.

A Bragg grating is created over a length of optical fiber by exposing segments along the length to different light in the ultraviolet range causing different indices of refraction. When light is passed through the optical fiber, the Bragg grating causes an interference pattern that depends on the length over which the Bragg grating extends; when the length changes, the pattern changes, and does so in a way that allows the change in length to be determined. Based on some predetermined correlation, the change in length of the optical fiber is then converted to a change in pressure.

For greater sensitivity, a Bragg grating is positioned at each end of a length of optical fiber affixed to a deformable mandrel. To sense changes in pressure over only a small volume, the optical fiber may be wound, under tension, about the outside of the deformable mandrel. If the pressure increases or decreases, the deformable mandrel changes in diameter, and the length of fiber optic between the Bragg gratings changes; this change in length of the optical fiber between the Bragg gratings at either end of the wound optical fiber can also be sensed by interferometry.

Optical fiber pressure sensors for sensing acoustic pressure in a fluid often must be sensitive to small changes in pressure in an environment of high ambient pressure. These sensors are sometimes constructed by winding an optical fiber, under tension, around a deformable mandrel. Such a construction allows high sensitivity to pressure in a relatively small volume.

Because the pre-strain of an optical fiber winding about a mandrel in such a construction is limited to below a maximum value (determined by fiber reliability and strength), as the ambient pressure increases and so deforms the mandrel more and more, the mandrel is increasingly less likely to deform in response to the small pressures of an acoustic wave, and at some ambient pressure the mandrel will have been squeezed to such an extent that the optical fiber will no longer be in tension. For example, in monitoring underwater acoustic waves, a pressure sensor might be positioned at a depth where, unless the sensor is specially constructed, the hydrostatic pressure would so squeeze the deformable mandrel that the optical fiber would no longer be in tension and so would not shrink in length were the deformable mandrel to further deform in response to an acoustic wave. For a given amount of pre-strain, the pressure at which the fiber becomes slack is a function of the mandrel stiffness. So to measure dynamic pressure in increasingly higher static pressure environments requires an increasingly stiffer, but then less sensitive mandrel. Such a less sensitive mandrel is not always acceptable.

A mandrel for use as part of a pressure sensor will not only deform in response to changes in pressure, but will also deform in response to changes in temperature. In monitoring dynamic pressures, such as acoustic pressures in a fluid, changes in the shape of a mandrel due to changes in temperature are usually of concern only because high temperatures can damage either the mandrel material or the optical fiber, or a large change in length can cause excessive drift in the interferometric signal. However, there are high temperature environments where monitoring dynamic pressure is useful. In some situations where monitoring dynamic pressure is needed, such as deep within an oil well, a pressure sensor is exposed to both high temperatures and high ambient static pressures. Thus, it is important for a pressure sensor to be able to withstand high temperatures and high ambient pressure, and yet still respond to dynamic pressure that is small relative to the ambient pressure.

In many applications it is useful and convenient to monitor dynamic pressure simultaneously at several locations, up to sometimes hundreds of locations. Ideally, in such an application, a single mandrel and optical fiber would be used, with the optical fiber wound about the mandrel only in each location where, with the mandrel deployed in the application, the dynamic pressure is to be sensed. When the optical fiber is wound at more than one location along the length of the mandrel, light of various frequencies can be introduced into the optical fiber and different windings can be made to reflect light of only a particular range of frequencies, depending on the Bragg gratings for the winding. Thus, each winding reflects light of a particular wavelength range back to a diagnostic center where the information from each winding can be extracted from the combined returning signal.

One difficulty in using a single mandrel bearing several optical fiber windings, however, is that the effect of a pressure wave at one location along the mandrel might propagate along the mandrel so as to be sensed at other locations. Another difficulty is that the temperature and ambient pressure a long mandrel experiences can vary significantly along the length of the mandrel. For example, in an oil well application, the down hole span of a mandrel sees a much higher temperature and ambient pressure than the span near the surface. A good design for the down hole span of the multi-sensor is not necessarily a good design for the near surface span; if the mandrel somehow compensates for high ambient pressure down hole, that compensation may not be appropriate for the near-surface span.

Moreover, for a multi-sensor application using a single long mandrel, the mandrel is liable to strain lengthwise because of either its own weight in a vertical deployment, or because of accumulated friction in a deployment where, for example, the mandrel is towed underwater, behind a ship. Such axial strain may stress the optical fiber wound around and laid down along the length of the mandrel, shortening the service life of the optical fiber and also causing excessive drift, over time, in the wavelength of the light reflected by the sensor.

What is needed is a mandrel-wound fiber optic pressure sensor that can measure dynamic pressures, such as acoustic wave pressures in a fluid, in an environment of high static pressures and high temperatures. Ideally, what is needed is such a sensor with a single optical fiber wound about the mandrel at many locations along the length of the mandrel, with one or more of each of the windings sandwiched by a pair of Bragg gratings inscribed in the optical fiber to provide, simultaneously, dynamic pressure measurements for each pair of fiber Bragg gratings. Then for each pair of Bragg gratings that sandwich only a single winding, the dynamic pressure can be measured at the relatively precise location of the winding, and for each pair of Bragg gratings that sandwiches a series of windings, the dynamic pressure averaged over the location of each of the sandwiched windings can be measured.

SUMMARY OF THE INVENTION

The present invention has an object providing a measurement of dynamic pressure in an environment of relatively high static pressure. A further object of the present invention is to provide such a measurement in the case of an environment of high ambient temperature, such as occurs downhole in an oil well. A still further object of the present invention is to provide an array of dynamic pressure sensors distributed over a length, in such a way as to provide a measurement of dynamic pressure at each sensor location without substantial interference from dynamic pressure effects at the locations of other sensors.

To meet these objects, the present invention provides a pressure sensor comprising: a deformable mandrel having a sensor zone encompassing some span of the mandrel; and an optical fiber secured to the outside of the mandrel so as to lie generally along the length of the mandrel outside of the sensor zone and spirally wound under tension about the outside of the mandrel within the sensor zone and having a Bragg grating inscribed adjacent both ends of the sensor zone. Light reflected from the two Bragg gratings provides information about the length of the optical fiber between the two Bragg gratings; this length changes as the mandrel contracts and expands in response to changing pressure, because the optical fiber is stretched or contracts in length to follow the change in shape of the mandrel. (Thus, there is a change in the delay between when light reflected from the two Bragg gratings returns to the light source, an effect that can be observed as either a direct measurement of the delay or by methods of interferometry.)

In another aspect of the present invention, the pressure sensor further comprises a core rod inside the mandrel extending along the length of the mandrel; an isolation zone encompassing a span of the mandrel adjacent the sensor zone, the isolation zone including a baffle system, located on the core rod adjacent the sensor zone, for baffling dynamic pressure, and including a stiffening means for providing a high hoop stiffness to the isolation zone; and a compensating fluid filling the space between the inside of the mandrel and the outside of the core rod; wherein the baffle system provides at least one passageway sufficient in cross section to allow for a gradual redistribution of the compensating fluid in the mandrel in response to quasi-static changes in pressure.

The present invention uses a specially constructed, substantially cylindrical, deformable mandrel, having an optical fiber spirally wound along some spans where the dynamic pressure is to be sensed. Along these spans where the pressure is to be sensed, the spiral winding, or in other words helical winding, is usually wound about the mandrel so that each coil of the winding lies in a plane that is nearly 90 degrees to the axis of the mandrel, under a predetermined tension. A winding with the plane of its coils oriented at nearly 90 degrees to the axis of the mandrel is here called a closed winding, as contrasted with what is here called an open winding, i.e. a winding with the plane of its coils oriented at a lower angle with respect to the axis of the mandrel. A closed winding maximizes the length of optical fiber wound about a span of the mandrel, providing a relatively sensitive measurement of the dynamic pressure at a relatively precise location.

Of course a helical winding does not have coils that actually lie in a plane; a helical winding is only approximately visualized as comprising coils (since the end of a coil does not line up with its beginning, but rather with the beginning of the next coil). But this description will resort to the fiction of coils lying in a plane so as to describe how compactly a helix is wound. Besides using the terms open and closed to indicate how an optical fiber is helically wound, the terms open and closed are also used here to describe any helical path, i.e. whether or not the path is traversed by an optical fiber. Thus, a closed helix, in the sense of a helical path, not a winding, is one in which the plane of a coil of the path is nearly 90 degrees from the axis of the helix.

Outside of the spans where the dynamic pressure is to be sensed, the same optical fiber is helically wound about the mandrel as an open winding, i.e. a winding of optical fiber in which in one encircling of the mandrel by the optical fiber, the optical fiber traverses a significant length of the mandrel, or, in other words, so that when projected onto any plane including the axis of the mandrel, the optical fiber winding makes an angle substantially less in magnitude than 90 degrees, as measured with respect to the axis of the mandrel.

In one aspect of the invention, the optical fiber is laid in a groove cut into the mandrel. The groove acts as a track for the optical fiber, extending axially, in an open helix, between where the dynamic pressure is to be sensed, and transitioning into a closed helical winding about the mandrel in each sensor zone. In another aspect of the invention, instead of laying the optical fiber in a groove cut in the mandrel, the optical fiber is made to adhere to the surface of the mandrel using a bonding agent.

In each sensor the optical fiber is helically wound about the mandrel under a predetermined tension. Therefore, as the mandrel deforms in response to dynamic pressure, the optical fiber spiral winding will also shrink or expand in diameter, so that end-to-end length of the spiral winding will vary with the dynamic pressure. This variation in the length of the optical fiber wound about the mandrel is converted into a measurement of the dynamic pressure by inscribing a Bragg grating in the optical fiber before the beginning and after the end of each winding, or before the beginning and after the end of each series of windings where the windings in a series are distributed over a span of mandrel to provide a measurement of the average dynamic pressure along the span. Then when light is introduced into the optical fiber there will be a detectable shift in the time delay of light reflected by the pair of Bragg gratings, the shift being proportional to the change in length of the optical fiber between the two Bragg gratings. The Bragg gratings themselves are usually located outside of any length of the optical fiber winding that strains, to any significant extent, in response to dynamic pressure, but need not be so located because the effect of any strain directly experienced by the Bragg gratings is usually small.

To provide a measurement of dynamic pressure in an environment of high ambient static or quasi static pressure, the mandrel on which the optical fiber is wound must be made to resist the high ambient static or quasi static pressure and yet still deform by varying in outer diameter in response to a relatively small dynamic pressure. To achieve this selective sensitivity, a high-viscosity, low bulk modulus compensating fluid, such as a silicone gel, is introduced into a hollow mandrel (i.e. a hollow, tubular structure), and a baffle system is built into the mandrel, just before and after each location where the optical fiber is wound in one helical winding or in a series of helical windings, to regulate the flow of the compensating fluid in the mandrel into and out of each region wound by the optical fiber. This flow includes any kind of redistribution of the compensating fluid, which is (at least slightly) compressible, in response to pressure changes. Besides allowing for redistribution of the compensating fluid, the baffle system also dampens acoustic waves propagating in the fluid inside the mandrel, reducing communication of dynamic pressure changes occurring in neighboring sensor zones.

In addition, the mandrel is manufactured to vary in circumferential stiffness along its length in such a way as to create three kinds of zones: a sensor zone in which the optical fiber is helically wound under tension in one or more locations along the mandrel (so that the sensor zone extends over a span including one winding or a series of windings); an isolation zone, including the baffle system, located on either side of a sensor zone; and a compensation zone at one or more locations along the mandrel. There are only as many compensation zones along a mandrel as are needed in an application. A single compensation zone may be enough if that allows sufficient flow of compensating fluid to adjust to the range of static pressures encountered in an application.

The isolation zone is made to have very high circumferential stiffness. Stiffness is achieved either by overwrapping the isolation zone part of the mandrel with a jacket having high hoop stiffness or by using a baffle system in the isolation zone that mechanically prevents the mandrel from reducing in outer diameter in response to either external static or dynamic pressure. Such a baffle system is provided by inserting into the mandrel a core rod, preferably made of a high strength temperature resistant plastic, machined so that in each isolation zone the core rod has slugs or washer-like protuberances to serve as baffles. The protuberances are intended to line up with the isolation zones when the core rod is inserted into the mandrel, and have passageways that allow the compensating fluid to flow between sensor zones and compensation zones. If instead an isolation zone is covered by a high stiffness jacket, the baffle system within the isolation zone does not have to mechanically prevent the isolation zone from deforming under pressure. Then the baffle system can be an open cell foam, which is compliant, surrounding the core rod and bonded to the core rod or mechanically held in place along the length of the core rod. Alternatively, the baffle system can be a fibrous filler adhered to the core rod and filling the space between the core rod and the inner mandrel surface, providing a fine network of passageways for constricted flow of the compensating fluid. Although each baffle system is located principally in an isolation zone, the baffles can, and preferably do extend into the adjacent sensor zones and compensation zones.

Sensor zones, because of being wound with optical fiber, are stiffer in the hoop direction than compensation zones. The intervening isolation zones, however, are stiffer than either the sensor zones or the compensation zones. Therefore, high-ambient static pressure enveloping both a compensation zone and a sensor zone will squeeze the compensation zone mandrel more than the sensor zone, forcing the compensating fluid from the compensation zone, through the passageways of the baffle system in the intervening isolation zone, and into the sensor zone. This flow occurs slowly because the compensating fluid is viscous and the passageways are small in cross section and thus impede the flow of the compensating fluid.

In response to dynamic pressure, however, because of the baffle system (based on passageways through protuberances, open cell foam, or a fibrous filler) in each isolation zone adjacent a sensor zone, the compensating fluid in a sensor zone can flow into and out of the adjacent isolation zones (and also itself compress), but the baffle system will damp out the flow of energy before it propagates beyond the isolation zone. Thus, in response to dynamic pressure, the sensor zone can compress and expand in response to dynamic pressure (and then return back to its original size after the pressure returns to its static value).

Another way of describing the pressure sensor of the present invention is to regard the pressure sensor as generally comprised of a deformable mandrel system, response to a pressure, for providing a deformable mandrel force; and an optical fiber having a pair of Bragg gratings inscribed in the optical fiber at different locations along its length, where the optical fiber is responsive to the deformable mandrel force, and further responsive to an optical signal, the optical fiber having Bragg gratings for providing Bragg grating light signals containing information about the pressure applied to the deformable mandrel. In this view, the mandrel system includes at least a mandrel, but the mandrel can be air-backed and the mandrel system can further include a core rod and compensating fluid, with a baffle system provided along some spans of the mandrel.

BRIEF DESCRIPTION OF THE DRAWINGS

The above and other objects, features and advantages of the invention will become apparent from a consideration of the subsequent detailed description presented in connection with accompanying drawings, in which.

DESCRIPTION OF THE PREFERRED EMBODIMENT

Figure 1:
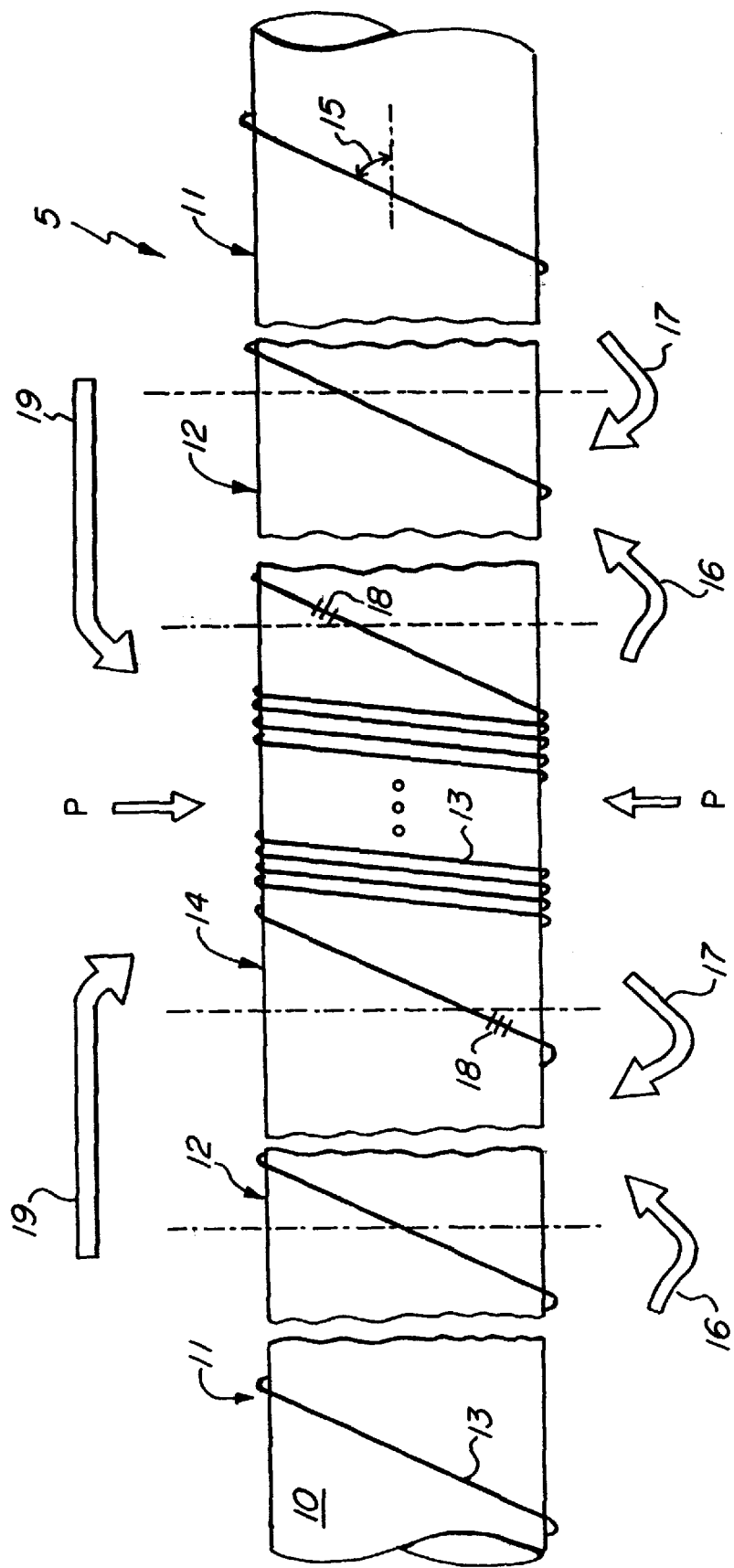
FIG. 1 is a diagram of a pressure sensor according to the present invention.

Referring now to FIG. 1, the present invention provides a pressure sensor 5 comprising: a deformable mandrel 10 having a sensor zone 14 encompassing some span of the mandrel; and an optical fiber 13 secured to the outside of the mandrel so as to lie generally along the length of the mandrel outside of the sensor zone and spirally wound under tension about the outside of the mandrel within the sensor zone and having a Bragg grating 18 inscribed adjacent both ends of the sensor zone. Light reflected from the two Bragg gratings 18 provides information about the length of the optical fiber between the two Bragg gratings; this length changes as the mandrel 10 contracts and expands in response to changing pressure indicated by arrows marked P, because the optical fiber 13 is stretched or contracts in length to follow the change in shape of the mandrel. (Thus, there is a change in the delay between when light reflected from the two Bragg gratings returns to the light source (not shown), an effect that can be observed as either a direct measurement of the delay or by methods of interferometry.)

Figure 2A:
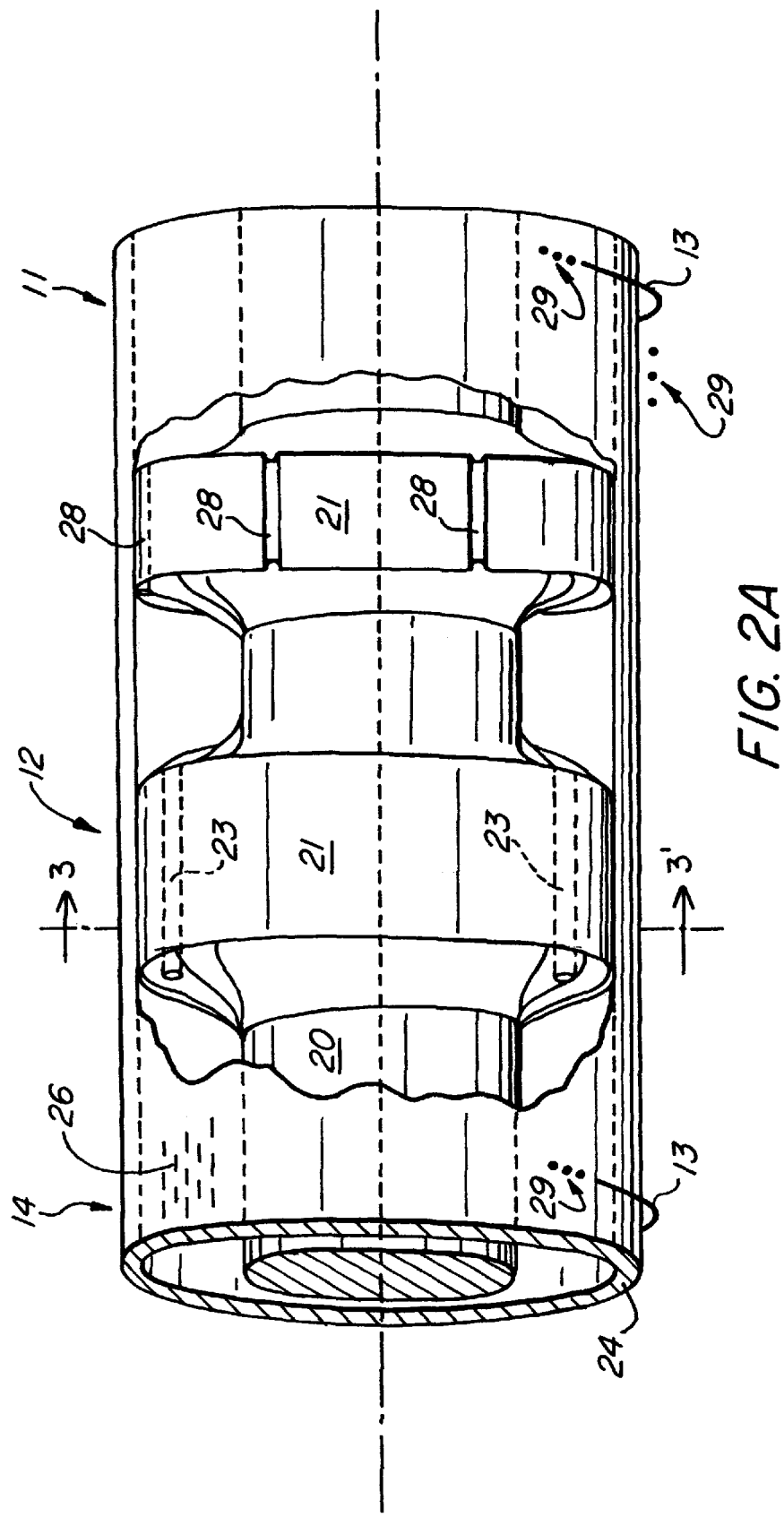
FIG. 2A is a cutaway view of the pressure sensor shown in FIG. 1 with a solid protuberance baffle system.

In another aspect of the present invention, as shown in FIG. 2A, the pressure sensor further comprises a core rod 20 inside the mandrel 10 extending along the length of the mandrel; an isolation zone 12 encompassing a span of the mandrel adjacent the sensor zone 14, the isolation zone including a baffle system 21, 23, and 28, located on the core rod adjacent the sensor zone, for baffling dynamic pressure, and including a stiffening means 21 for providing a high hoop stiffness to the isolation zone; and a compensating fluid 26 filling the space between the inside of the mandrel and the outside of the core rod; wherein the baffle system provides at least one passageway 23 or 28 sufficient in cross section to allow for a gradual redistribution of the compensating fluid in the mandrel in response to quasi-static changes in pressure.

The embodiment of FIG. 2A also uses a mandrel 10 made of a homogeneous material 24, one that ideally provides a relatively low hoop strength, rendering the mandrel deformable under dynamic pressure, but also provides a relatively high axial strength. FIG. 2A also shows part of a sensor zone 14 and part of a compensation zone 11, in order to illustrate that in both of these zones, although the mandrel 10 is wound on the outside with the optical fiber 13 (with its continued winding about the mandrel indicated by ellipses 29), inside the mandrel there is, essentially, only the core rod 20 and compensating fluid 26.

Referring back to FIG. 1, a pressure sensor generally indicated as 5 is shown having a span of a mandrel 10 bearing an optical fiber 13 wound in a closed helix, under a predetermined pre-strain tension, in a sensor zone 14 of the mandrel. The sensor zone 14 is sandwiched by isolation zones 12 in which the optical fiber 13 is wound in an open helix. Beyond the isolation zones 12 are compensation zones 11, along which the optical fiber 13 is also wound in an open helix; in the compensation zone 11, the optical fiber 13 is wound in a helix so as to make a particular angle 15 with respect to the longitudinal axis of the mandrel. Ideally, the particular angle, which depends on the mandrel 10, is that angle for which the hoop strain and the Poisson's strain are equal in magnitude but opposite in sense. At this angle, as a mandrel compresses under pressure (hoop strain), since it also lengthens (Poisson's strain), the helically wound optical fiber experiences no strain, just a slight change in shape. For example, if the mandrel experiences greater pressure and so compresses and simultaneously lengthens, the helix reduces in diameter but also lengthens, leaving the length between any two points on the helix the same.

Outside the sensor zone 14, instead of as an open helical winding, the optical fiber 13 is sometimes laid generally lengthwise along the outside of the mandrel 10, allowing some margin for following any lengthening of the mandrel 10 because of Poisson's effect (i.e. lengthening associated with radial compression). However the optical fiber 13 is laid outside the sensor zone 14, in the preferred embodiment, the optical fiber 13 is placed in a groove (not shown) cut into the mandrel 10; in another embodiment, the optical fiber 13 is bonded to the mandrel 10.

The mandrel is constructed out of materials that impart to it a relatively low Young's modulus so that, if air-backed (i.e. hollow), it can deform in response to changes in pressure. As shown in FIG. 1, if the mandrel 10 is helically wound with an optical fiber 13 in the sensor zone 14, when the mandrel is squeezed by an increase in external pressure, the mandrel will decrease in its diameter. Then the tension-wound optical fiber will shrink in length so that the length between Bragg gratings 18 will decrease. Therefore, when light is introduced into the optical fiber 13, the pair of Bragg gratings 18 will reflect light at a difference in time that is changed compared to the difference in time for light reflected by the pair of Bragg gratings 18 separated by the original length of optical fiber. Although not necessary, in the preferred embodiment, the Bragg gratings themselves should be located so as to experience little or no strain; strain of the optical fiber 13 where a Bragg grating is inscribed will shift the wavelength of light reflected from the Bragg grating, disturbing the pressure measurement. Thus, the optical fiber 13 should lie along the mandrel 10 so that the Bragg gratings 18 end up in the optical fiber 13 over a span of the mandrel 10 that does not deform. In the preferred embodiment, the two Bragg gratings 18 associated with a sensor zone 14 are positioned just inside the isolation zones 12 on either side of the sensor zone.

When the mandrel 10 is placed in an environment of high ambient pressure, such as under several thousand feet of water, the mandrel may be squeezed so much that the optical fiber coil of the sensor zone becomes slack. When that happens, the optical fiber is no longer useful in sensing dynamic pressure because it will not reduce in length as the mandrel collapses under an increase in pressure.

To use such a mandrel in a high ambient static pressure application (including applications where the pressure changes quasi-statically, i.e. slowly relative to pressure changes that occur, for example, in an acoustic wave either underwater or in air) the sensor system must be designed not to deform so much under the static pressures likely to be encountered that optical fiber becomes slack. It is not possible to simply wrap the optical fiber tight enough to remain taut regardless of how much the mandrel shrinks in diameter, because of the finite elastic limit of the optical fiber. Therefore, the approach taken in the present invention is to prevent the mandrel from collapsing too much under high-ambient static pressure, but to allow, nevertheless, the mandrel to still deform in response to dynamic pressure, which can then be sensed in terms of the shrinking in length of the optical fiber between Bragg gratings 18.

Referring now to FIG. 2A, this selective response to pressure is achieved by filling the mandrel with a compensating fluid 26, and by inserting into the mandrel along its length a core rod 20 and a baffle system in the two adjacent isolation zones 12. The baffle system shown in FIG. 2A is based on protuberances 21 having passageways 23 and 28; the protuberances 21 end up, with the core rod inserted into the mandrel 10, in the isolation zones on either side of the sensor zone 14 (FIG. 1), as described below. In the preferred embodiment, the compensating fluid 26 is a high viscosity, low bulk modulus fluid, such as silicone fluid.

Still referring to FIG. 2A, a section of an isolation zone 12 of the mandrel 10 is shown in cutaway so that the core rod 20 with protuberances 21 is visible. The core rod 20 can be made of various materials, and in the preferred embodiment is made of a high temperature thermoplastic material, such as graphite composite, with high stiffness in the axial direction provided by reinforcing fibers. The core rod 20 is machined down to a core diameter, except in some locations where protuberances 21 remain, having passageways 23 and 28. A protuberance 21, can have passageways on its periphery or through its body, i.e. peripheral passageways 28 or body passageways 23.

Figure 2B:
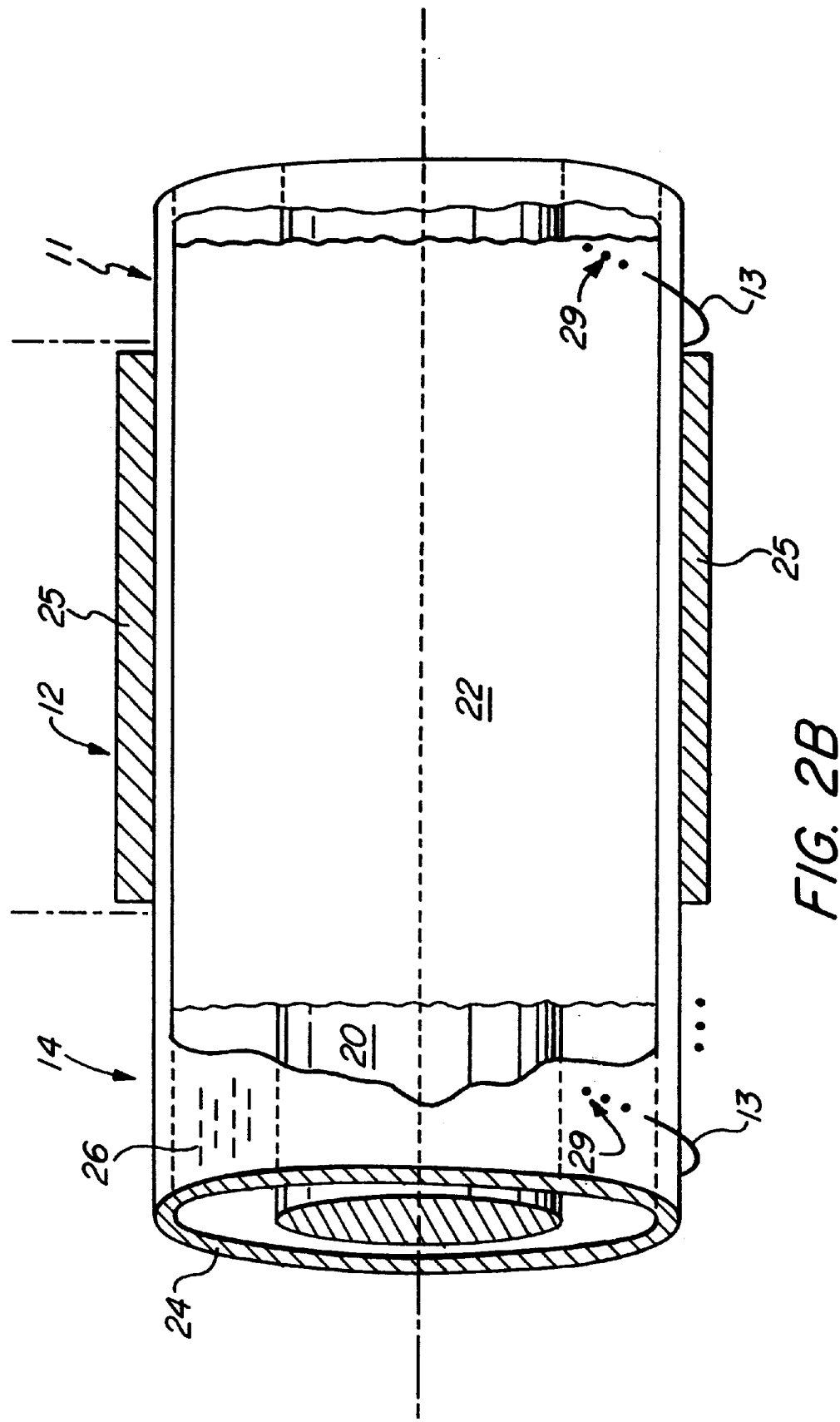
FIG. 2B is a cutaway view of the pressure sensor shown in FIG. 1 with an open cell foam or fiber-filled baffle system.

Referring now to FIG. 2B, instead of depending on protuberances machined out of the core rod, the baffle system consists of an open cell foam 22 affixed to the core rod 20 so as not to slide along the core rod. The open cell foam is affixed to the core rod mechanically or by a bonding agent. In this embodiment, the isolation zone 12 of the mandrel is covered by a high hoop stiffness jacket 25 to prevent the mandrel from deforming in the isolation zone, because the open cell foam baffle system is compliant, unlike the baffle system based on protuberances of the core rod. In a still further embodiment, instead of an open cell foam, the baffle system utilizes a fibrous filler, which also provides a fine network of passageways for constricted flow of the compensating fluid 26.

In the mechanical protuberance embodiment, the passageways 23 and 28 allow for a slow redistribution of the compensating fluid 26 in response to quasi-static pressure, and also absorb the energy of pressure waves emanating out from the sensor zone 14 (see FIG. 1). These two functions are accomplished by making the passageways small, to inhibit flow (and so allow flow only slowly through the passageways) and by providing more passageway cross-sectional area near the sensor zone than near the adjacent isolation zones (thus allowing pressure waves to easily enter isolation zones from a sensor zone, but preventing the pressure waves from reaching the far sides of the isolation zones. The gradient in passageway cross-sectional area is provided either by more passageways near the sensor zone, by passageways of greater cross-sectional area near the sensor zone, or by protuberances that are smaller in axial length near the sensor zone. In the preferred embodiment, the passageways are made larger in cross section nearer the sensor zone, and the protuberances are made to closely fit the inside diameter of the mandrel.

In the protuberance embodiment, the core rod 20 is constructed so that the protuberances 21 have a very high hoop strength; in the open cell foam embodiment, the mandrel 10 is overwrapped with a jacket having high hoop strength. Therefore, in either embodiment, the isolation zone 12 is essentially unyielding even in an environment of high ambient static pressure. But in such an environment, the compensating fluid 26 will flow, slowly, as shown in FIG. 1 by arrows 17, from the compensation zones 11 through the baffle system of the isolation zone 12 and into the sensor zone 14, which, because of being helically wound with the optical fiber 13, is stiffer (in the hoop direction) than the compensation zones. The compensating fluid thus provides a quasi-static pressure inside the mandrel that substantially balances the ambient quasi-static pressure on the outside of the mandrel.

In response to an increase in dynamic pressure, however, because the baffle system is designed to make flow of the compensating fluid between a sensor zone and the near region of an isolation zone relatively uninhibited (compared to flow all the way through an isolation zone), the mandrel will deform in the sensor zone. As shown in FIG. 1 by arrows 16, if the dynamic pressure is increasing, the sensor zone 14 can and does constrict and force compensating fluid out through the baffle system into the isolation zone 12. If the volume in which the pressure is changing extends to include not only the sensor zone 14 but also at least some of a compensation zone 11 outside of the isolation zone 12, the compensation zone 11 will deform, extruding compensation fluid into the isolation zone 12. This flow into the isolation zones 12 from compensation zones 11 in response to a pressure change is indicated in FIG. 1 by arrows 17.

Figure 3:
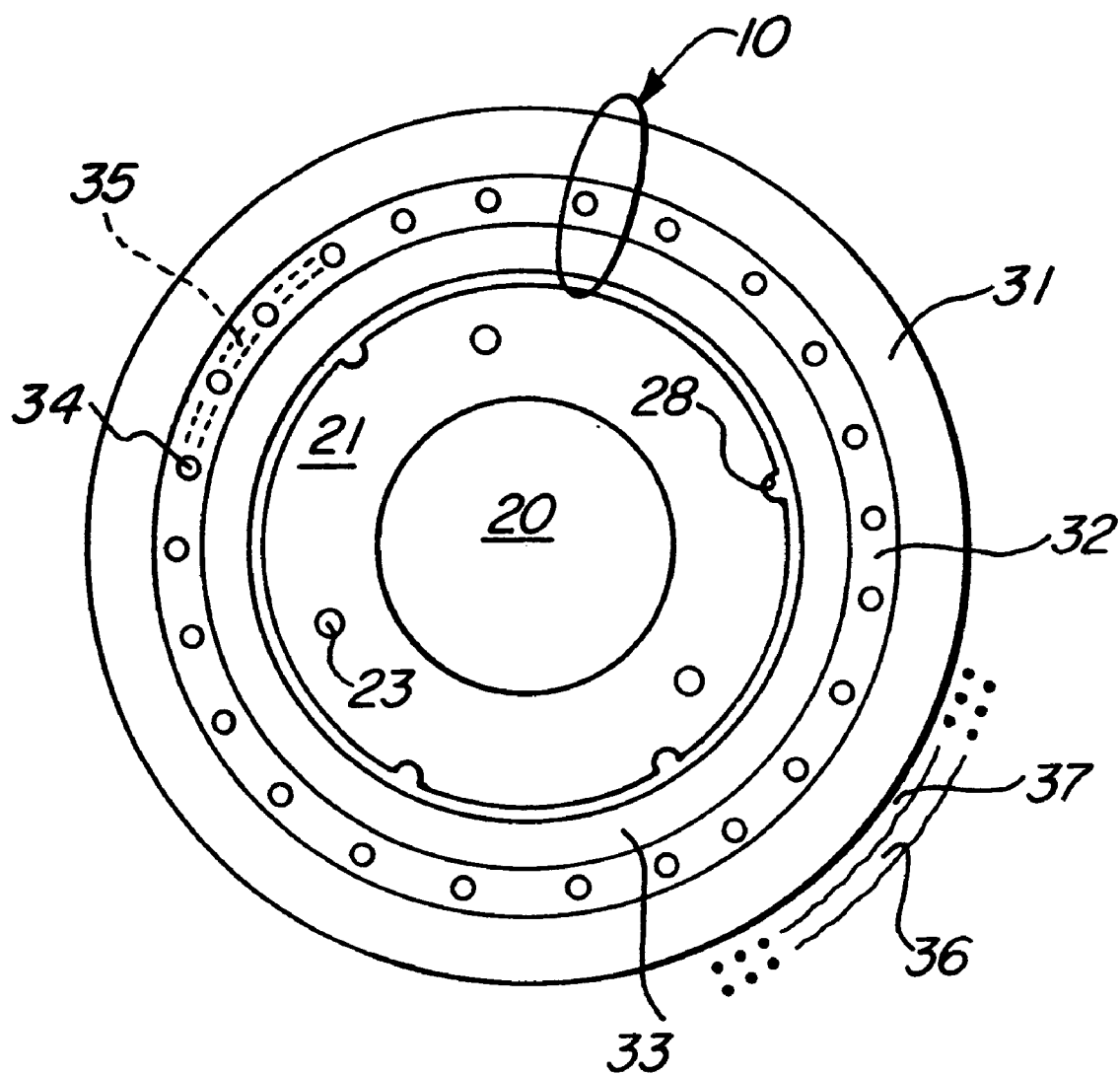
FIG. 3 is a cross-section of the cutaway view of FIG. 2A along lines 3–3' showing a multi-layered fiber reinforced construction of a mandrel, and also showing an end-on view of a protuberance and its passageways.

Referring now to FIG. 3, a cross-section of a mandrel 10 according to the present invention is shown along with a core rod 20 having protuberances 21 with passageways 23 and 28. The mandrel, in order to resist both high temperatures and high axial loads, is, in the preferred embodiment, constructed in three layers. A first layer 31 of a high temperature polymer surrounds a second layer 32 of resin 35, reinforced by reinforcing fibers 34. The second, composite layer surrounds a final, third layer of the same or a different high temperature polymer 33, with an inner diameter nearly the same as the maximum outer diameter of protuberance 21. As plastic is generally used as the technical term for polymer, the layer 31 and layer 33 of the mandrel 10 could just as well be said to be layers of a high temperature plastic.

The high temperature polymer of the first layer is preferably a polytetrafluoroethylene (PTFE), commercially available for example as TEFLON® from E. I. DuPont deNemours & Co.; polyetheretherketone (PEEK), commercially available under the tradename PEEK 450GL30 from Victrex; perfluoroalkoxy (PFA), commercially available for example as TEFLON® PFA from E. I. DuPont deNemours & Co.; polyetherimide (PEI), commercially available for example as Ultem 7201 from General Electric Corporation; or fluorinated ethylene-propylene (FEP), commercially available for example as TEFLON® FEP from E. I. DuPont deNemours & Co.

The reinforcing fibers 34 of the second layer are in some applications preferably biaxially braided or contra-helically wound, as disclosed in copending U.S. patent application entitled, "Composite Form as a Component for a Pressure Transducer," Ser. No. 09/326,098 now U.S. Pat. No. 6,191, 414 filed on the same date as this application and hereby incorporated by reference.

It is of course possible to construct the mandrel out of a single material of low hoop strength, so that it deforms under pressure, without regard for axial loading, high ambient pressure, or high ambient temperature when the environment in which the sensor system is to operate is more forgiving. Thus, for example, if a sensor system according to the present invention is to sense dynamic pressure at various points along a line extending just below the surface of a body of water, a mandrel would be constructed as described above but without a core rod and compensating fluid. In order to prevent cross talk between sensor windings at different locations along the mandrel, though, a means for dampening the mandrel undulations can be provided, if needed. However, the distance between sensors is usually such that undulations emanating from one sensor die out, without any particular provision, in the span between the sensor and the adjacent sensors. If measures must be taken to prevent cross talk, isolation zones are provided and the mandrel is overwrapped with a rigid composite material in each isolation zone to resist, in the isolation zone, the deforming action of dynamic pressure. The three-layer construction of the mandrel in the preferred embodiment provides a stiffness similar to a polycarbonate tube used as a sensor mandrel in the prior art.

The passageways through protuberances in an isolation zone are, in the preferred embodiment, pinhole in size, and the combination of passageways in a particular isolation zone creates a multi-path pinhole leak system. The baffles should not take up much of the internal volume of the isolation zone where they are located, and the size of the passageways should be largest near the adjacent sensor zone and should decrease in the direction toward the adjacent compensation zone. The pinhole-size passageways and relatively large volume left for the compensating fluid allow, at acoustic frequencies, flow of the compensating fluid from the sensor zone into the isolation zone; in other words, the effective Young's modulus of the sensor zone, i.e. the Young's modulus for response to acoustic pressures, is kept to a relatively low value (compared to that of the isolation zone) because the compensating fluid can flow out of a sensor zone at acoustic frequencies.

In another aspect of the present invention, the passageways in an isolation zone adjacent a sensor zone are not made to decrease in size in moving away from a sensor zone, nor are any steps taken to impede the flow of compensating fluid, in any way, further from a sensor zone than nearer it, i.e. no flow impedance gradient is provided by the baffle system. Such a system is less costly to manufacture, yet often still provides acceptable sensor performance.

In the preferred embodiment, the volume of reinforcing fiber in the resin between the two layers of polytetrafluoroethylene tube should be from 10–40% of the volume occupied by the resin, and so is significantly less than the usual 50–65% used in conventional composite structures. Such a reinforcing fiber volume will provide a coefficient of thermal expansion that is less than 10 PPM/° C., and will suppress thermally induced strains in the optical fiber. Such a low volume of reinforcing fiber will also provide a Young's modulus of less than 500 ksi, which is important to ensure a low hoop stiffness and thus a high sensor sensitivity.

Where a series of optical fiber helical windings on a mandrel provide dynamic pressure measurements in an application with a range of ambient static pressures, a sensor in a region of higher pressure may not function, and the optical fiber winding in a sensor zone at lower pressure may experience an increase in strain sufficient to shorten its service life. For example, in an oil well application, the downhole sensor sees a much greater pressure than sensors located near the surface. If countermeasures are not taken, the greater downhole pressure will drive compensating fluid toward the surface, engorging the near-surface mandrel zones. Thus, the mandrel in the downhole sensor zone may reduce so much in diameter that its optical fiber winding goes slack, and can no longer follow the mandrel deformations in response to dynamic pressure.

There are several possible counter-measures for the problem presented by pressure gradients. First, the mandrel can be sealed off at appropriate locations. Next, pressure compensation can be adjusted for each sensor. Alternatively, in the case of an oil well application, the downhole sensor can be made to communicate freely with the "mud" fluid in the oil well so that there is essentially no difference in pressure across the mandrel for the downhole sensor.

In the preferred embodiment, however, a means is provided to seal off different spans of the mandrel, isolating each span from the rest of the mandrel to prevent the buildup of excessive pressure in the spans located where the ambient static pressure is lower. The sealing off is provided by, for example, pinching down on the mandrel against the core rod inside the mandrel. This pinching prevents the compensating fluid from moving in bulk away from the higher pressure areas. Thus, sealing prevents a large buildup of pressure head along the length of the mandrel. Each such sealed off span, in the preferred embodiment, includes one or more sensor zones and associated Bragg gratings and isolation zones, and at least one compensation zone.

It is important to ensure that the pinching or sealing does not impart excessive compressive straining of the mandrel wall. Therefore, the inner diameter of the mandrel and the outer diameter of the core rod should differ in size no more than from approximately 0.010" to approximately 0.020". In other words, the inner diameter of the mandrel should not be more than 0.020" greater than the diameter of the core rod, corresponding to a gap of no more than approximately 0.010". This maximum gap corresponds to approximately a 5% strain in the mandrel when it is pinched down to the core rod to seal off adjacent sensor zones.

In another aspect of this invention, in order to free the optical fiber windings of steady state axial strain, which could result in early failure of the optical fiber, not only is a compensating fluid used, but other steps are taken as well. The pressure compensation provided by the compensating fluid can reduce the pressure differential across the walls of the mandrel to about 10% of the ambient static pressure. In an oil well application, at well pressures as high as 10 ksi, the strains that would be induced in the mandrel and optical fiber coil could be as high as 0.5%. Strains due to thermal expansion at 200° C., a typical downhole ambient temperature, can be as high as 2%. Bending induced strains due to spooling of the mandrel can be as high as 1%. When an optical fiber is strained to approximately 0.5% in winding it under tension around the mandrel, any additional strain can significantly reduce the reliability of the optical fiber because of static fatigue effects. In addition, a pre-strain of the fiber to 0.5% to maintain a fiber tension under even a differential pressure of only 1 ksi will contribute to early failing of the optical fiber in a severe thermal environment such as an oil well application.

Referring again to FIG. 3, to further free the optical fiber windings of steady state axial strain, in the preferred embodiment, there is a buffer of silicone gel material 36 provided between the mandrel 10 and the optical fiber winding 13 in each sensor zone 14; the silicone gel buffer material 36 is provided to a thickness of approximately 0.0025" either by applying it directly to the mandrel 10 or by applying it to the optical fiber. This gel is soft at relatively low temperatures, i.e. temperatures typically in the range from 0–100° C., so the optical fiber wound about the mandrel can slice into the gel instead of straining in response to a high pressure differential across the wall of the mandrel. The silicone buffer also allows the optical fiber to displace in response to strains caused by spooling of the mandrel. At the same time, the mandrel must be strong and elastic over the temperature range 0–100° C. so the mandrel does not fail or yield plastically on its spool.

In applications where the ambient temperature can be expected to exceed 100° C., such as an oil well application, further measures are taken to reduce static strain in the optical fiber. At 200° C., a mandrel according to the present invention can expand in the hoop direction more than 2%. Since a mandrel according to the present invention is typically around ½" in diameter, a 2% expansion corresponds to an increase in diameter of 0.010", which is too great a change for the 0.0025" thickness of silicone coating. Therefore, referring still to FIG. 3, in such applications, a polymer coating 37 of about 0.020" thickness with a TG of about 100° C. is applied to the mandrel 10 before applying the silicone gel. Then when the thermal expansion of the mandrel exceeds the capability of the silicone coating (first buffer material), the polymer coating (second buffer material) softens, permitting the optical fiber to cut into it. Thus, this just-at-the-right-temperature softening allows the optical fiber to continue its strain response in higher temperature environments, preserving the service life of the optical fiber.

The principle of just-at-the-right-temperature softening can be applied to other temperature environments besides a high temperature environment. In general, various buffer materials are used to provide acceptable operation over a range of temperatures by providing closest to the mandrel a thickness of the material that will soften at the highest temperature, and so on. Thus, according to this scheme, the material in contact with the optical fiber is the material that will soften at the lowest temperature to be encountered. With today's materials, it is reasonable to select buffer materials that soften at temperatures that differ by as much as approximately 40° C., but the present invention envisions the use of different buffer materials with softening temperatures much closer in value.

A person skilled in the art would appreciate how the optic fiber Bragg grating sensors are used as sensor elements. Gratings such as those described in U.S. Pat. No. 4,725,110, entitled "Method for Impressing Gratings Within Fiber Optics", to Glenn et al may be used in the present invention. See also U.S. Pat. No. 4,950,883 to Glenn for a "Fiber Optic Sensor Arrangement Having Reflective Gratings Responsive to Particular Wavelengths." However, any wavelength tunable grating or reflective element embedded in an optical fiber may be used if desired.

As described therein, a data acquisition unit has a broadband light source or laser diode with suitable photo optic couplers. Demodulators and filtering equipment can be used to monitor the shift in the wavelength of light reflected by a Bragg grating caused by strain undergone by the Bragg grating. When a Bragg grating is illuminated, it reflects a narrow band of light at a specified wavelength. A measurand, such as strain induced by pressure or temperature, will cause a change in the Bragg grating spacing, shifting the wavelength of the light it reflects. The value of the measurand is directly related to the shift in the wavelength of the light reflected by the Bragg grating. If more than one Bragg grating is used, wave division multiplexing techniques can be used to sense the shifts in wavelength of the light reflected from each individual Bragg grating. A readout device can be positioned so that a continuous reading of strain can be provided.

As is well known in the art, there are various optical signal analysis approaches that may be utilized to analyze return signals from Bragg gratings, such as are disclosed in U.S. Pat. Nos. 4,996,419; 5,361,130; 5,401,956; 5,426,297; and/or 5,493,390, all of which are hereby incorporated by reference. These approaches may be generally categorized as follows:

a) direct spectroscopy utilizing conventional dispersive elements, such as line gratings or prisms, and a linear array of photodetector elements;

b) passive optical filtering with a device having a wavelength-dependent transfer function;

c) tracking using a tuneable filter such as, for example, a scanning Fabry-Perot filter, an acousto-optic filter such as the filter described in the above referenced U.S. Pat. No. 5,493,390, or fiber Bragg grating based filters; and d) interferometric detection.

The particular technique used will depend on the Bragg wavelength shift, which in turn depends on the sensor design, and will also depend on the frequency range of the measurand to be detected. The scope of the invention is not intended to be limited to any particular optical signal analysis approach.

Alternatively, a portion or all of an optical fiber between a pair of gratings (and at the gratings, if desired) may be doped with a rare earth dopant (such as erbium) to create a tunable fiber laser, such as is described in U.S. Pat. No. 5,317,576, "Continuously Tunable Single Mode Rare-Earth Doped Laser Arrangement", to Ball et al or U.S. Pat. No. 5,513,913, "Active Multipoint Fiber Laser Sensor", to Ball et al, or U.S. Pat. No. 5,564,832, "Birefringent Active Fiber Laser Sensor", to Ball et al, which are incorporated herein by reference.

In applications involving a series of pressure transducers disposed along a single optical fiber, the various strain sensors, each serving as a component of a different pressure transducer in the series of pressure transducers, may be multiplexed along the single optical fiber using wavelength division multiplexing (WDM), time division multiplexing (TDM), or other multiplexing techniques.

The strain sensors may be configured using any type of optical grating-based measurement technique, e.g., scanning interferometric, scanning Fabry-Perot, acousto-optic tuned filter, optical filter, time of flight, etc. having sufficient sensitivity to measure the changes in the circumference of the pipe, such as that described in one or more of the following references: A. Kersey et al., "Multiplexed fiber Bragg grating strain-sensor system with a Fabry-Perot wavelength filter", Opt. Letters, Vol 18, No. 16, August 1993, U.S. Pat. No. 5,493,390, issued Feb. 20, 1996 to Mauro Verasi, et al., U.S. Pat. No. 5,317,576, issued May 31, 1994, to Ball et al., U.S. Pat. No. 5,564,832, issued Oct. 15, 1996 to Ball et al., U.S. Pat. No. 5,513,913, issued May 7, 1996, to Ball et al., U.S. Pat. No. 5,426,297, issued Jun. 20, 1995, to Dunphy et al., U.S. Pat. No. 5,401,956, issued Mar. 28, 1995 to Dunphy et al., U.S. Pat. No. 4,950,883, issued Aug. 21, 1990 to Glenn, U.S. Pat. No. 4,996,419, issued Feb. 26, 1991 to Morey, all which are hereby incorporated herein by reference in their entirety.

In case of wrapping a mandrel according to the present invention with an optical fiber without using Bragg gratings, known interferometric techniques may be used to determine the length or change in length of the optical fiber around the mandrel due to pressure, such as Mach Zehnder or Michaelson Interferometric techniques, as described in U.S. Pat. No. 5,218,197, entitled "Method and Apparatus for the Non-Invasive Measurement of Pressure Inside Pipes Using a Fiber Optic Interferometer Sensor" to Carroll. Interferometric sensors may be multiplexed as described in Dandridge, et al, "Fiber Optic Sensors for Navy Applications", IEEE, February 1991, or Dandridge, et al, "Multiplexed Interferometric Fiber Sensor Arrays", SPIE, Vol. 1586, 1991, pp176–183. Other techniques to determine the change in fiber length may be used.

It is also possible to wrap an optical fiber around only a portion of the mandrel in order to sense a change in circumference of the mandrel because of a change in pressure, provided the length of optical fiber is long enough to optically detect changes to the circumference. Also, when a single grating is used per pressure transducer, the grating would be attached to themandrel, and the reflection wavelength of the grating would shift with changes in circumference of the mandrel. When a pair of gratings is used per sensor, known Fabry-Perot, interferometric, time of flight or fiber laser sensing techniques may be used to measure the fiber length or change in fiber length due to a change in circumference, in a manner such as that described in the aforementioned references.

As has been described above, a pressure transducer according to the present invention can use any kind of strain sensor in combination with the here disclosed mandrel. For example, besides a strain sensor based on optical signal processing as the other component of a pressure transducer, a piezoelectric strain sensor could be used to sense the change in shape of the mandrel. Such a strain sensor could then be arranged to provide either an electrical or optical signal, and such signals could be multiplexed in various ways known in the art, to allow for a series of pressure transducers arranged over a single optical fiber.

It is to be understood that the above-described arrangements are only illustrative of the application of the principles of the present invention. Numerous other modifications and alternative arrangements may be devised by those skilled in the art without departing from the spirit and scope of the present invention, and the appended claims are intended to cover such modifications and arrangements.

What is claimed is:

1. A pressure sensor for sensing ambient pressure, comprising:
   a) a deformable mandrel having a sensor zone encompassing some span of the mandrel, the sensor zone for changing in shape in response to a change in ambient pressure; and
   b) an optical fiber secured to the mandrel so as to lie generally along the length of the deformable mandrel, and within the sensor zone so as to lie spirally wound under tension about at least a portion of the sensor zone span of the deformable mandrel, and having a Bragg grating inscribed adjacent both ends of the sensor zone, the optical fiber wound about at least a portion of the sensor zone for responding to the changing in shape of the sensor zone in response to a change in ambient pressure.

2. A sensor as claimed in claim 1, further comprising:
   c) a core rod inside the deformable mandrel extending along the length of the deformable mandrel;
   d) an isolation zone encompassing a span of the deformable mandrel adjacent the sensor zone, the isolation zone including a baffle system, located on the core rod adjacent the sensor zone, for baffling dynamic pressure, and including a stiffening means for providing a high hoop stiffness to the isolation zone; and
   e) a compensating fluid filling the space between the inside of the deformable mandrel and the outside of the core rod;
wherein the baffle system provides at least one passageway sufficient in cross section to allow for a gradual redistribution of the compensating fluid in the deformable mandrel in response to quasi-static changes in pressure.

3. A sensor as claimed in claim 2, wherein the baffle system comprises at least one protuberance having the at least one passageway therethrough.

4. A sensor as claimed in claim 3, wherein the stiffening means is provided by having at least some of the outermost surface of the at least one protuberance in mechanical contact with the inner surface of the deformable mandrel.

5. A sensor as claimed in claim 2, wherein the baffle system comprises material selected from the group consisting of open cell foam and fibrous filler.

6. A sensor as claimed in claim 5, wherein the stiffening means of the isolation zone is a jacket of material having a high hoop stiffness overwrapping the isolation zone.

7. A sensor as claimed in claim 1, wherein the deformable mandrel is constructed of three concentric tubes: an outermost tube of high-temperature-resistant plastic; a next, inner tube of resin having reinforcing fibers; and an innermost tube of the same material as the outermost tube.

8. A sensor as claimed in claim 7, wherein the outermost tube is made from a high temperature polymer.

9. A sensor as claimed in claim 8, wherein the reinforcing fibers are oriented generally lengthwise along the deformable mandrel, thereby imparting to the deformable mandrel a high Young's modulus for axial strain of the deformable mandrel, and allowing a low Young's modulus for hoop strain of the deformable mandrel.

10. A sensor as claimed in claim 2, wherein the baffle has a plurality of passageways arranged so as to provide a larger total cross section of passageway nearer the sensor zone than farther from the sensor zone.

11. A sensor as claimed in claim 1, wherein outside the sensor zone the optical fiber is wrapped about the deformable mandrel in a helical winding at an angle with the deformable mandrel axis such that the hoop strain and Poisson's strain of the deformable mandrel are substantially equal in magnitude but opposite in sense, thereby providing that the optical fiber will not change in length as it follows the changes in shape of the deformable mandrel in response to changes in pressure.

12. A sensor as claimed in claim 1 wherein a first buffer material is provided in the sensor zone between the deformable mandrel and each spiral winding of the optical fiber on the deformable mandrel, the first buffer material being soft enough at a first temperature to be displaced by the optical fiber if the deformable mandrel expands, thereby reducing axial strain in the optical fiber.

13. A sensor as claimed in claim 12, wherein a second buffer material is provided in the sensor zone between the deformable mandrel and each spiral winding of the optical fiber on the deformable mandrel, the second buffer material softening enough to be displaced by the optical fiber winding only at second temperature higher than the first temperature.

14. A pressure sensor, comprising:
   a) a deformable mandrel system, responsive to a change in ambient pressure, for providing a deformable mandrel force; and
   b) an optical fiber having a pair of Bragg gratings therein, responsive to the deformable mandrel force, and further responsive to an optical signal, for providing Bragg grating light signals containing information about the change in ambient pressure.

15. A pressure sensor according to claim 14, wherein the optical fiber is wrapped in a helical winding about at least one span of the deformable mandrel system.

16. A pressure sensor according to claim 15, wherein the optical fiber is wrapped under a predetermined tension in a helical winding about at least one span of the deformable mandrel system.

17. A pressure sensor according to claim 16, wherein the optical fiber is affixed to the deformable mandrel system.

18. A pressure sensor according to claim 16, wherein the Bragg grating light signals contain information about a detectable shift in a time delay of light reflected by the pair of Bragg gratings, and the detectable shift is proportional to a change in a length of the optical fiber between Bragg gratings.

19. A pressure sensor according to claim 14, wherein the deformable mandrel system is a cylindrical air-backed mandrel having an outer jacket, a core rod therein, and a volume filled with a high-viscosity, low bulk modulus compensating fluid.

20. A pressure sensor according to claim 14, wherein the deformable mandrel system is made of a single material of low hoop strength.

21. A pressure sensor according to claim 14, wherein the deformable mandrel system includes an outer jacket, a core rod therein, and a volume filled with an open cell foam.

22. A pressure sensor, comprising:
   a) a deformable mandrel having a sensor zone encompassing some span of the mandrel, and having;
   b) a core rod inside the deformable mandrel extending along the length of the deformable mandrel;
   c) an isolation zone encompassing a span of the deformable mandrel adjacent the sensor zone, the isolation zone including a baffle system, located on the core rod adjacent the sensor zone, for baffling dynamic pressure, and including a stiffening means for providing a high hoop stiffness to the isolation zone; and
   d) a compensating fluid filling the space between the inside of the deformable mandrel and the outside of the core rod; and
   e) a means of sensing a change in shape of the deformable mandrel in the sensor zone, and of providing a signal corresponding to the change in shape.

23. A pressure sensor as in claim 22, wherein the means of sensing a change in shape of the deformable mandrel comprises an optical fiber.

24. A pressure sensor as in claim 23, wherein the optical fiber has a Bragg grating.

25. A pressure sensor as claimed in claim 1, further comprising two isolation zones, each encompassing a span of the deformable mandrel, one on either side of and adjacent the sensor zone, the isolation zones including a stiffening means for providing a high hoop stiffness, wherein the Bragg gratings are located in the isolation zones.

26. A pressure sensor as claimed in claim 14, further comprising two isolation zones, each encompassing a span of the deformable mandrel system, one on either side of and adjacent a sensor zone span of the mandrel system, the isolation zones including a stiffening means for providing a high hoop stiffness, wherein the Bragg gratings are located in the isolation zones.

* * * * *